US011939931B2

(12) United States Patent
Williams et al.

(10) Patent No.: US 11,939,931 B2
(45) Date of Patent: Mar. 26, 2024

(54) ENGINE CONTROL SYSTEM

(71) Applicant: Perkins Engines Company Limited, Peterborough (GB)

(72) Inventors: Gavin Williams, Stamford (GB); Peter Ladlow, Bourne (GB); Max Best, Peterborough (GB); Mark Scaife, Huntingdon (GB)

(73) Assignee: Perkins Engines Company Limited, Peterborough (GB)

( * ) Notice: Subject to any disclaimer, the term of this patent is extended or adjusted under 35 U.S.C. 154(b) by 94 days.

(21) Appl. No.: 17/606,662

(22) PCT Filed: Apr. 20, 2020

(86) PCT No.: PCT/EP2020/025180
§ 371 (c)(1),
(2) Date: Oct. 26, 2021

(87) PCT Pub. No.: WO2020/216470
PCT Pub. Date: Oct. 29, 2020

(65) Prior Publication Data

US 2022/0205404 A1 Jun. 30, 2022

(30) Foreign Application Priority Data

Apr. 26, 2019 (GB) ...................................... 1905873

(51) Int. Cl.
*F02D 41/14* (2006.01)
*F02D 41/24* (2006.01)

(52) U.S. Cl.
CPC ..... *F02D 41/1406* (2013.01); *F02D 41/2422* (2013.01); *F02D 41/2477* (2013.01);
(Continued)

(58) Field of Classification Search
CPC ............. F02D 41/1406; F02D 41/1451; F02D 41/2422; F02D 41/2477; F02D 2041/1413; F02D 2041/1433
See application file for complete search history.

(56) References Cited

U.S. PATENT DOCUMENTS 6,823,675 B2 11/2004 Brunell
7,206,688 B2 4/2007 Wang
(Continued)

FOREIGN PATENT DOCUMENTS

CN 101578558 B 8/2014
DE 102009021781 A1 11/2010
(Continued)

OTHER PUBLICATIONS

International Search Report related to PCT Application No. PCT/EP2020/025180 dated Jul. 23, 2020.
(Continued)

*Primary Examiner* — Hung Q Nguyen
*Assistant Examiner* — Mark L. Greene

(57) ABSTRACT

An internal combustion engine controller comprising a memory and a processor is provided. The memory is configured to store a plurality of control maps, each control map defining a hypersurface of actuator setpoints for controlling an actuator of the internal combustion engine based on a plurality of input variables to the internal combustion engine controller. The processor comprises an engine setpoint module and a map updating module. The engine setpoint module is configured to output a control signal to each actuator based on a location on the hypersurface of the respective control map defined by the plurality of input variables. The map updating module is configured to calculate an optimised hypersurface for at least one of the control maps. The optimised hypersurface is calculated based on a real-time performance model of the internal combustion engine com-
(Continued)

prising sensor data from the internal combustion engine and the plurality of input variables. The map updating module further is configured to update the hypersurface of the control map based on the optimised hypersurface. A method of controlling an internal combustion engine is also provided.

19 Claims, 5 Drawing Sheets

(52) U.S. Cl.
CPC ................ *F02D 2041/1413* (2013.01); *F02D 2041/1433* (2013.01); *F02D 41/1451* (2013.01)

(56) References Cited

U.S. PATENT DOCUMENTS

| | | | | |
|---|---|---|---|---|
| 7,565,333 | B2 | 7/2009 | Grichnik | |
| 7,726,287 | B2 * | 6/2010 | Sekfane | F02D 41/064 123/568.2 |
| 8,155,857 | B2 | 4/2012 | Loeffler | |
| 8,738,271 | B2 * | 5/2014 | Lu | G06F 18/2411 703/2 |
| 9,200,583 | B2 | 12/2015 | Jiang | |
| 9,328,674 | B2 | 5/2016 | Geveci | |
| 9,346,469 | B2 * | 5/2016 | Glugla | F02D 41/2487 |
| 10,060,373 | B2 | 8/2018 | Wang | |
| 11,118,518 | B2 * | 9/2021 | Charbonnel | F02D 41/402 |
| 11,131,226 | B2 * | 9/2021 | Charbonnel | F01N 3/18 |
| 2010/0168989 | A1 | 7/2010 | Gao | |
| 2011/0162350 | A1 | 7/2011 | Ponnathpur | |
| 2011/0264353 | A1 | 10/2011 | Atkinson | |
| 2011/0301723 | A1 | 12/2011 | Pekar | |
| 2013/0111905 | A1 | 5/2013 | Pekar | |
| 2015/0094939 | A1 | 4/2015 | D'Amato | |
| 2016/0160787 | A1 | 6/2016 | Allain | |
| 2017/0211493 | A1 | 7/2017 | Kidd | |
| 2018/0112616 | A1 | 4/2018 | Wang | |
| 2018/0113963 | A1 | 4/2018 | Kordon | |
| 2018/0119628 | A1 | 5/2018 | Zeller | |
| 2018/0347498 | A1 | 12/2018 | Maloney | |
| 2022/0205405 | A1 * | 6/2022 | Williams | F02D 41/2477 |
| 2022/0235721 | A1 * | 7/2022 | Williams | F02D 41/1406 |

FOREIGN PATENT DOCUMENTS

| | | | |
|---|---|---|---|
| DE | 102020129903 | A1 * | 5/2022 |
| EP | 1045123 | A2 | 10/2000 |
| EP | 1340888 | A2 | 9/2003 |
| EP | 1437931 | A2 | 7/2004 |
| EP | 1972767 | A1 | 9/2008 |
| EP | 2116836 | A | 11/2009 |
| JP | 2018169818 | A * | 11/2018 |
| WO | 2013136090 | A1 | 9/2013 |

OTHER PUBLICATIONS

Great Britain Search Report related to Great Britian Application No. 1905873.4 dated Oct. 28, 2019.

* cited by examiner

Input Variable 2

Input Variable 1

| | 500 | 1000 | 1500 | 2000 | 2500 | 3000 | 3500 | 4000 |
|---|---|---|---|---|---|---|---|---|
| 0.2 | 1 | 1 | 3 | 3 | 3 | 3 | 3 | 3 |
| 0.4 | 1 | 2 | 3 | 3 | 3 | 3 | 3 | 3 |
| 0.6 | 3 | 3 | 3 | 3 | 3 | 3 | 3 | 3 |
| 0.8 | 3 | 3 | 3 | 3 | 3 | 3 | 3 | 3 |
| 1 | 3 | 3 | 3 | 3 | 3 | 3 | 3 | 3 |
| 1.2 | 3 | 3 | 3 | 3 | 3 | 3 | 3 | 3 |
| 1.4 | 3 | 3 | 3 | 4 | 5 | 5 | 5 | 5 |
| 1.6 | 3 | 3 | 3 | 4 | 6 | 7 | 7 | 7 |
| 1.8 | 3 | 3 | 4 | 4 | 5 | 8 | 9 | 9 |
| 2 | 3 | 4 | 5 | 6 | 7 | 8 | 10 | 11 |

31

ENGINE CONTROL SYSTEM

This patent application is a 35 USC § 371 U.S. national stage of International Application No. PCT/EP2020/025180 filed on Apr. 20, 2020, which claims the benefit and priority of Great Britain Application No. 1905873.4 filed on Apr. 26, 2019.

FIELD OF THE DISCLOSURE

The present disclosure relates to the control of an internal combustion engine. More specifically this disclosure relates to a system and method for controlling the engine actuators of an internal combustion engine.

BACKGROUND

Internal combustion engines often include one or more systems for managing the emissions output from the exhaust of the internal combustion engine. For example, internal combustion engines often include an after-treatment system for treating the exhaust gas produced by the internal combustion engine.

Typical after-treatment systems may include many sensors and control actuators. Further sensors and control actuators may be provided in the internal combustion engine for monitoring exhaust gas, performance, and/or efficiency of the internal combustion engine. As such, internal combustion engines may include many independent controllable variables and calibration values. Thus, the design of an engine control system for an internal combustion engine is a multi-dimensional control problem.

Engine control systems need to provide setpoints to the actuators of the internal combustion engine in response to real time changes in the operating conditions of the internal combustion engine. The desire for high efficiency internal combustion engines which meet emissions regulations places a further restraint on the design of a control system. A further restraint on the design of the control system is that the amount of computing power available to the engine control system may be limited.

Conventionally, control of the internal combustion engine and after-treatment system is managed by an on-board processor (an engine control module). Due to the complexity of the internal combustion engine and after-treatment system, the engine control implemented typically utilises an open loop control system based on a series of "control maps" comprising pre-calibrated, time-invariant setpoints for the internal combustion engine and after-treatment system. Typically, the setpoints controlled include fuel mass, start of injection (SOI), exhaust gas recirculation (EGR) and inlet manifold absolute pressure (IMAP).

Some simple control maps comprise a plurality of look up tables, in which a number of time invariant engine setpoints are stored associated with different engine operation conditions. An engine control module can simply read out engine setpoints from the control map associated with a desired engine operation. Some engine control maps can also provide estimates of one variable as a function of a limited number of other variables. Engine setpoint maps can only be based on a limited number of input variables due to the exponential increase in memory and map complexity as additional variables are included. In some cases, system memory can be compromised, but at the expense of interpolation error.

One method for reducing effects on performance of open-loop control scheme is to provide different control maps for different operating regimes. For example, different control maps may be provided for idle operation and full throttle operation, or start-up. Providing many different engine control maps per engine makes calibration of each engine expensive and time consuming. Also, these pre-calibrated maps are each time-invariant lookup tables. Accordingly, these time-invariant maps make cannot take account of part-to-part variations in engine parts, or unmeasured influences like humidity for example. Time invariant maps also cannot accommodate variations in engine part performance over time.

An alternative approach is to implement real-time, on-board, model-based control of the engine to replace the calibrated control maps. As such, an engine model directly controls one or more of the setpoints of the internal combustion engine. Model-based engine controls may include dynamic engine models to predict engine performance, emissions and operating states. Predicted engine performance can be fed back into the model to further optimise the control setpoints. As such, model-based control methods effectively incorporate a form of negative feedback into the engine control system in order to improve performance and emissions.

Model-based control is difficult to implement as the engine control setpoints must be calculated in real time. Accordingly, model-based engine controllers including predictive elements ideally complete their predictions in real time as well. Thus, many model-based control schemes require significant computational resources to optimise model output within a suitable timescale for controlling an internal combustion engine.

One known example of a model-based control scheme is disclosed in US 2016/0160787. US 2016/0160787 discloses a controller comprising a real-time dynamic computational model and a real-time optimiser. The real-time optimiser is configured to adjust at least one engine control signal on the basis of at least one output of a computational model. As such, US 2016/0160787 discloses a controller providing direct, model-based control of an internal combustion engine.

SUMMARY OF THE DISCLOSURE

According to a first aspect of the disclosure, an internal combustion engine controller is provided. The internal combustion engine controller comprises a memory and a processor. The memory is configured to store a plurality of control maps, each control map defining a hypersurface of actuator setpoints for controlling an actuator of the internal combustion engine based on a plurality of input variables to internal combustion engine controller. The processor comprises an engine setpoint module, and a map updating module. The engine setpoint module is configured to output a control signal to each actuator based on a location on the hypersurface of the respective control map defined by the plurality of input variables. The map updating module is configured to calculate an optimised hypersurface for at least one of the control maps, wherein the optimised hypersurface is calculated based on a real-time performance model of the internal combustion engine comprising sensor data from the internal combustion engine and the plurality of input variables. The map updating module is further configured to update the hypersurface of the control map based on the optimised hypersurface.

Accordingly, the internal combustion engine controller comprises two processing modules, an engine setpoint module and a map updating module. The engine setpoint module is configured to control a plurality of actuators of an internal combustion engine. For example, the engine setpoint module may control one or more of SOI, EGR, fuel mass, and inlet manifold absolute pressure requested (IMAPR) for an internal combustion engine. The engine setpoint module controls these actuators based on a performance input to the internal combustion engine, for example a user demand for torque, engine speed etc, or specified sensor data from the internal combustion engine (e.g. current IMAP). The control of each actuator is determined based on a control map for each actuator. Each control map defines a hypersurface for controlling an actuator of the internal combustion engine based on a plurality of input variables to internal combustion engine controller. As such, the engine setpoint module is effectively an open loop control module which utilises the actuator setpoints stored in the control maps to control the actuators.

The map updating module may be considered to be separate from the open loop control of the engine setpoint module. The map updating module is configured to optimise the control of the internal combustion engine by updating a hypersurface of a control map. A real-time performance model of the internal combustion engine is used to calculate an optimised hypersurface for updating the control map. As such, the real-time performance model does not directly control the actuator setpoints of the internal combustion engine. Accordingly, the controller according to the first aspect provides a controller incorporating a real-time performance model of the internal combustion engine in a robust manner.

By providing a plurality of updatable control maps, a control map based controller may be provided which can be optimised to a range of different operating points using a limited number of control maps. Thus, the number of control maps that need to be calibrated for an internal combustion engine may be reduced, as the updatable maps of this disclosure may provide control covering a range of different operating points for which separate control maps may have been calibrated in the past. Accordingly, the complexity of initial calibration and set-up of an internal combustion engine may be reduced.

Furthermore, time invariant control maps known in the art are typically calibrated with relatively large safety margins in order to accommodate any changes in the internal combustion engine over time. By contrast, the map updating module according to the first aspect may update the actuator setpoints of the control maps in response to the modelled real-time performance of the internal combustion engine. Thus, the control maps of the first aspect may be configured to cause the internal combustion engine to operate under more optimal performance conditions.

Indeed, the map updating module utilises a real-time performance model of the internal combustion engine comprising sensor data from the internal combustion engine and the plurality of input variables. As such, the map updating module may take into account a many different variables when calculating an optimised hypersurface. Thus, in contrast to known open loop map-based control systems, the internal combustion engine controller according to the first aspect may also take into account engine sensor data in addition to the specified plurality of input variables used in the control maps. Sensor data from the internal combustion engine may comprise physical sensor data generated by physical sensors of the internal combustion engine. As such physical sensor data may be representative of a direct measurement of the internal combustion engine. Sensor data from the internal combustion engine may also comprise virtual sensor data, where virtual sensor data is derived from a combination of measurements and mathematical processes to form a signal estimate in place of a direct measurement.

According to this disclosure, the hypersurface defined by each control map is intended to refer to the relationship between the actuator setpoint to be controlled (i.e. output) and the input(s) to the control map. As such, it will be appreciated that the hypersurface may be defined by the relationship between n inputs to the control map and the corresponding actuator setpoint outpoint. For example, the hypersurface may be defined by a relationship between a single input and an output actuator setpoint. In other embodiments, the hypersurface may be defined by a relationship between two or three inputs and an actuator output, in which case the relationship may be visualised as a two or three dimensional surface respectively.

The hypersurface defined by the control maps of this disclosure may be represented in any suitable manner for implementing the open loop map based control of the engine actuator setpoints. For example, in some embodiments, the hypersurface may be defined by a lookup table defining a plurality of actuator setpoints (i.e. co-ordinates) on the hypersurface. As such, the control map may be a look-up table comprising a plurality of numerical engine actuator setpoints. Various locations on the hypersurface may be found by interpolation between the points stored in the look-up table as is known in the art. In other embodiments, the hypersurface may be defined by one or more functions/mathematical relationships. For example, a hypersurface defined by n input variables may be represented by a parameter varying universal approximation function, or any other suitable function. The map updating module may then calculate the optimised hypersurface comprising a group of updated actuator setpoints. As such, the hypersurface may be updated by updating at least some of the "co-ordinates" stored in the look-up table.

The map updating module according to the first aspect is configured to calculate an optimised hypersurface based on a real-time performance model of the internal combustion engine comprising sensor data from the internal combustion engine and the plurality of input variables. As such, the map updating module seeks to optimise the hypersurface according to a model of the real-time performance of the internal combustion engine. It will be appreciated that the map updating module does not have direct control of the internal combustion engine however. Thus, the rate at which the map updating module may calculate an optimised hypersurface is not tied to the rate at which the actuator setpoints of the internal combustion engine are updated. Accordingly, the computational requirements of the map updating module may be relaxed relative to control systems which have direct control of the actuator setpoints. For example, by relaxing the computational requirements of the map updating module, the map updating module may increase the number of input variables to be used when calculating an optimised hypersurface in to improve the performance of the optimised hypersurface calculated.

The map updating module is configured to calculate the optimised hypersurface based on a model of real-time performance of the internal combustion engine. Thus, it will be appreciated that the map updating module will output an optimised hypersurface within a time period such that the input sensor data from the internal combustion engine and corresponding modelled performance from which the optimised hypersurface is calculated are still relevant to the actual performance and setpoints of the internal combustion engine. In general, the map updating module may output an optimised hypersurface corresponding to a characteristic frequency of a disturbances which changes the optimal calibration. For example, in some embodiments, the map updating module may calculate an optimised hypersurface in a time period of no greater than 1 second. In some embodiments, the map updating module is configured to calculate an optimised hypersurface in a time period of no greater than: 500 ms, 400 ms, 300 ms, 200 ms, or 100 ms. In one embodiment, the map updating module is configured to calculate an optimised hypersurface in a time period of no greater than 60 ms.

The map updating module may be configured to calculate an optimised hypersurface for each of the control maps concurrently. In some embodiments, the map updating module may be configured to update the hypersurface of each of the control maps based on the respective optimised hypersurfaces. By calculating the optimised hypersurface for each of the maps concurrently, the search space available to the map updating module is increased. Accordingly, the performance of the optimised hypersurfaces calculated by the map updating module may be improved as a result of the greater search space available.

The map updating module may be configured to calculate an optimised hypersurface by modelling a real-time performance of the internal combustion engine using the real-time performance model for a plurality of candidate groups of actuator setpoints; and calculating the optimised hypersurface based on the modelled real-time performance calculated.

In some embodiments, the map updating module comprises an optimiser module, an engine modelling module, and a cost module. The optimiser module is configured to search for an optimised hypersurface wherein the optimiser module provides a plurality of candidate groups of actuator setpoints to an engine modelling module. The engine modelling module is configured to calculate a plurality of engine performance variables associated with each candidate group of actuator setpoints based on the input variables, sensor data from the internal combustion engine and the candidate group of actuator setpoints. The cost module is configured to evaluate the engine performance variables and output a cost associated with each candidate group of actuator setpoints to the optimiser module. The optimiser module is configured to calculate the optimised hypersurface for the at least one control map based on the candidate groups of actuator setpoints and the associated costs. As such, the optimiser module may output the optimised hypersurface such that the map updating module updates the control map based on the optimised hypersurface. Accordingly, the map updating module may be configured to calculate an optimised hypersurface based on a real-time performance model of the internal combustion engine (i.e. engine modelling module) comprising sensor data from the internal combustion engine in addition to the input variables used in the control maps.

The optimiser module may be configured to search for an optimised hypersurface for each of the control maps. Accordingly, each candidate group of actuator setpoints includes an actuator setpoint for each of the control maps to be updated. The optimiser module may be configured to calculate an optimised hypersurface for each control map based on the candidate groups of actuator setpoints and the associated costs and to output an optimised hypersurface for each control map. Accordingly, the map updating module is configured to update each control map based on a corresponding optimised hypersurface.

The optimiser module may comprise a plurality of optimiser functions, each optimiser function configured to search for an optimal hypersurface independently of the other optimiser functions. Each optimiser function may be configured to output updated control hypersurfaces at different rates. That is to say, the optimiser functions may comprise a first function having a first calculation period, a second function having a second calculation period, a third function having a third calculation period and a n'th function having an n'th calculation period. For example, an optimiser function may include a first function (e.g. an instantaneous state optimiser function) configured to output an updated control hypersurface based on a current state within a first time period, and a second function (e.g. a converged state optimiser function) configured to output an updated control hypersurface based on a converged state in a second time period. The converged state optimiser function may configured to output control maps which have a more significant (dominant) influence on the converged state operating point, for example IMAP. In one embodiment, the first time period may be shorter than the second time period. Accordingly the control maps may be updated at different rates.

The cost module may be configured to evaluate the engine performance variables based on a plurality of cost parameters. The cost parameters may provide weights, or limits for the cost module in order to calculate a cost for candidate group of actuator setpoints. The cost parameters may comprise time varying cost parameters. For example, the costs may vary based on an input from an aftertreatment system connected to the internal combustion engine.

In some embodiments, one candidate group of actuator setpoints may be based on the control signal output of the engine setpoint module. As such, the optimiser module may include the current control map setpoints as a candidate group for consideration by the optimiser. It will be appreciated that current control map setpoints may be based on previously calculated optimised hypersurfaces. Accordingly, the map updating module may incorporate a form of memory of previous optimised hypersurfaces.

According to a second aspect of the disclosure a method of controlling an internal combustion engine is provided. The method comprises:

(i) providing a plurality of control maps each control map defining a hypersurface of actuator setpoints for controlling an actuator of the internal combustion engine based on a plurality of input variables to internal combustion engine controller;

(ii) outputting a control signal to each actuator based on a location on the hypersurface of the control map defined by the plurality of input variables; and (ii) updating at least one of the control maps comprising: calculating an optimised hypersurface for at least one of the control maps, wherein the optimised hypersurface is calculated based on a real-time performance model of the internal combustion engine comprising sensor data from the internal combustion engine, and updating the hypersurface of the control map based on the optimised hypersurface.

Accordingly, the method of the second aspect of the disclosure may be performed by the internal combustion engine controller of the first aspect of the disclosure. As such, the method of the second aspect may have all of the advantages associated with the internal combustion engine controller of the first aspect of the disclosure. The second aspect may also incorporate method features corresponding to any of the optional features described above for this first aspect.

BRIEF DESCRIPTION OF THE FIGURES

The invention will now be described in relation to the following non-limiting figures. Further advantages of the disclosure are apparent by reference to the detailed description when considered in conjunction with the figures in which.

DETAILED DESCRIPTION

Figure 1:
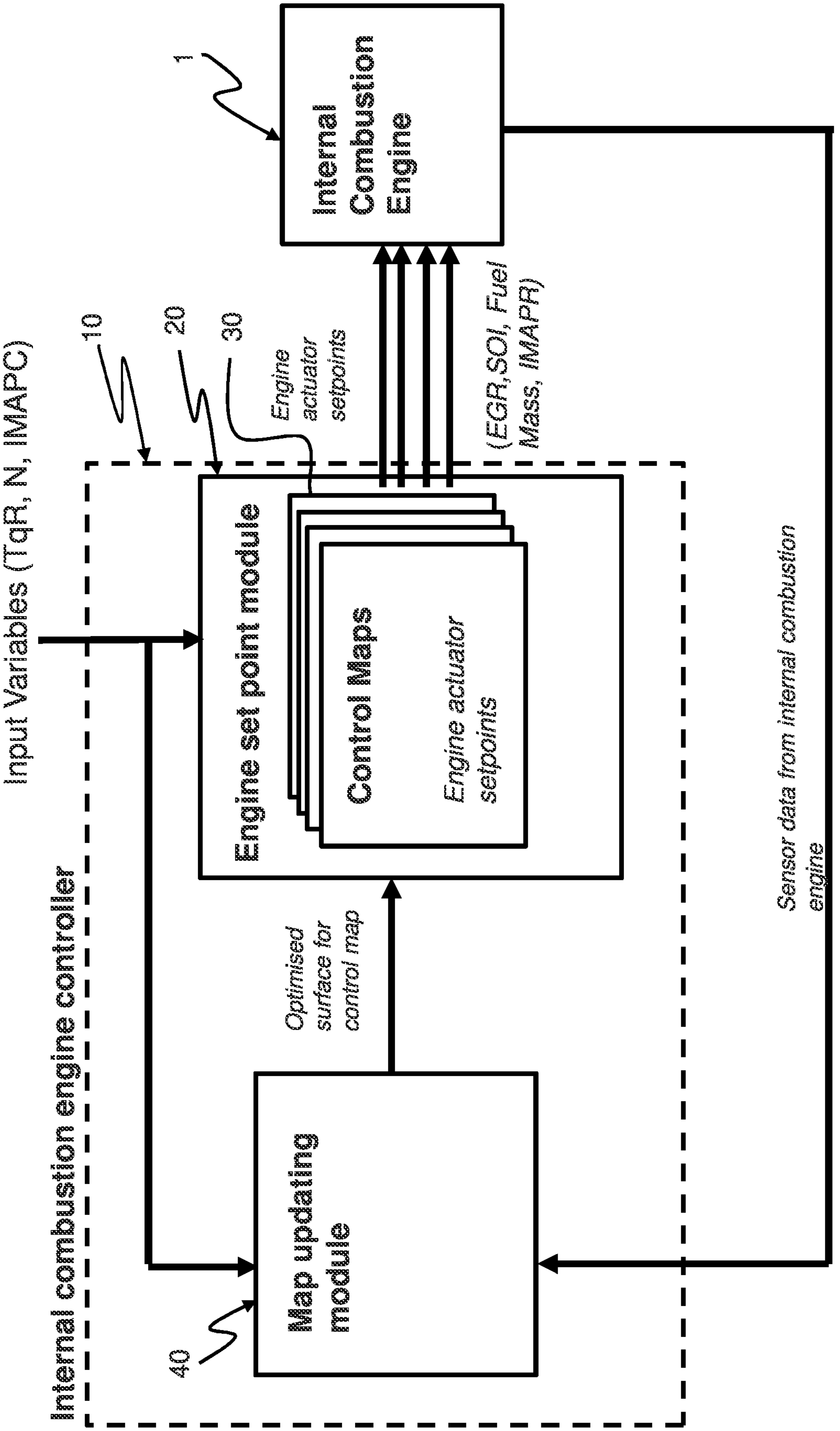
FIG. 1 shows a block diagram of a system comprising an internal combustion engine and an internal combustion engine controller according to an embodiment of this disclosure.

A general system diagram of an internal combustion engine 1 and an internal combustion engine controller 10 according to an embodiment of this disclosure is shown in FIG. 1.

The internal combustion engine controller 10 may comprise a processor and a memory. As such, the internal combustion engine controller 10 may be implemented on any suitable computing device known in the art. The internal combustion engine module may be provided on a dedicated engine control unit (e.g. an engine control module) comprising one or more processors and integrated memory. The internal combustion engine controller 10 may be connected to a variety of inputs and outputs in order implement the control scheme of this disclosure. As such, the internal combustion engine controller 10 may be configured to receive various input variables signals, sensor data and any other signals that may be used in the control scheme. For example, the internal combustion engine controller 10 may be configured to receive engine sensor data such as Engine Speed, Barometric pressure, Ambient temperature, IMAP, Inlet Manifold Air Temperature (IMAT), EGR mass rate (or sensors used to derive an EGR mass estimate), Fuel rail pressure, and/or Air system valve positions, Fuel mass estimate, and/or aftertreatment sensor data such as Engine out NOx (e.g. Net Indicated Specific NOx), Tailpipe NOx, Diesel particulate filter soot sensor (differential pressure sensor and/or an RF soot sensor), Diesel oxidation catalyst inlet temperature, and/or SCR inlet temperature.

As shown in FIG. 1, the actuators of the internal combustion engine are controlled by a plurality of engine actuator setpoints. The engine actuator setpoints are controlled the internal combustion engine controller 10. In the embodiment of FIG. 1, the engine actuators to be controlled are EGR, SOI, Fuel Mass, and IMAP. Of course, in other embodiments, the engine actuators to be controlled may be varied.

As shown in FIG. 1, the internal combustion engine controller comprises an engine setpoint module 20. The engine setpoint module 20 is configured to output a control signal to each actuator based on the plurality of control maps 30 and the input variables to the engine setpoint module 20. As such, the operation of the engine setpoint module 20 is similar to the open loop, engine map based control schemes known in the prior art. Such open loop control schemes have relatively small computational requirements compared to more complex model-based control schemes.

The input variables to the engine setpoint module 20 may be a combination of different variables derived from the current operation of the internal combustion engine. Some of the input variables may be based on performance demands of the internal combustion engine. Some of the input variables may be based on the current operating state of the internal combustion engine, for example as measured by various sensors. As the input variables are used to determine an actuator setpoint based on a control map, it will be appreciated that the total number of input variables per control map may be restricted by the computational resources available to the internal combustion engine controller 10.

In the embodiment of FIG. 1, the input variables are requested torque (TqR), current engine speed (N), and current IMAP. In other embodiments, other input variables may be used such as current EGR (i.e. the current position of the EGR valve).

In general, it will be appreciated that some control actuators associated with the internal combustion engine may have some time lag associated with them. As such, there may be some time delay between a change in requested actuator setpoint (e.g. Requested IMAP) and the change being recorded by a sensor (i.e. a sensor reading of current IMAP).

Each of the plurality of control maps 30 defines a relationship between one or more of the input variables and an actuator setpoint. In the embodiment of FIG. 1, four control maps 30 are provided, one for controlling each of EGR, SOI, Fuel Mass, and IMAP Requested (IMAPR). Each of the control maps 30 may define an engine actuator setpoint based on one or more of the TqR, N and current IMAP (IMAPC). For example, the EGR control map may define a hypersurface of actuator setpoints based on the TqR, N, and IMAPC. As such, a combination of TqR, N and IMAPC defines a location of the hypersurface from which an actuator setpoint for EGR can be calculated. Similarly, the control maps 30 for SOI and Fuel mass may also be defined by a hypersurface which is a function of TqR, N, and IMAPC. The control map for IMAPR in the embodiment of FIG. 1 may be defined by a hypersurface which is a function of TqR and N. As such, different control maps may have a different number of dimensions.

Figures 2A, 2B:
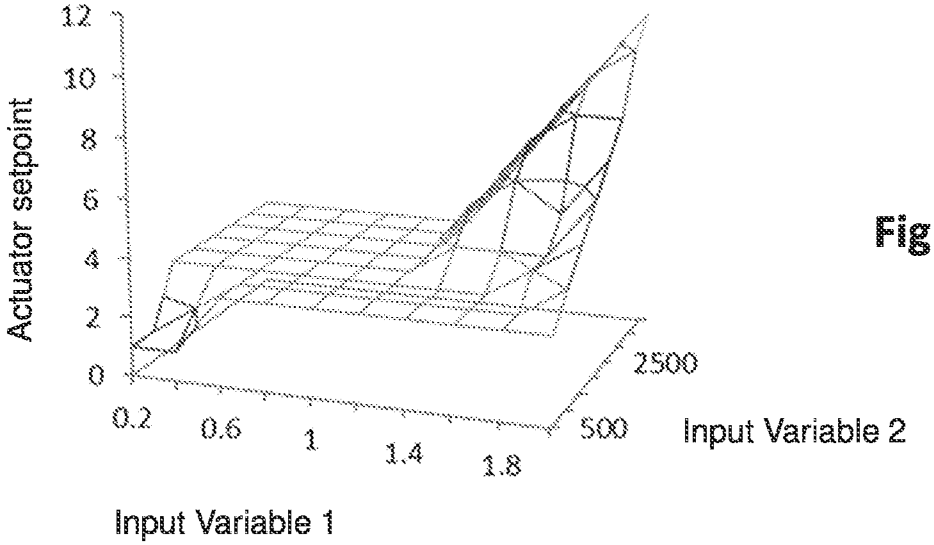
FIG. 2*a* shows an example of a look-up table control map according to an embodiment of this disclosure.
FIG. 2*b* is a graphical representation of the hypersurface defined by the example look-up table control map of FIG. 2*a*.

Each of the control maps 30 of FIG. 1 may be implemented as a look-up table. Look-up table control maps 30 for engine controllers are well known in the art. An exemplary look-up table control map 31 is shown in FIG. 2*a*. The look-up table control map 31 shown in FIG. 2*a* has two input dimensions and a single output dimension. Accordingly, in the embodiment of FIG. 2*a*, the control map 31 is a two-dimensional control map, wherein the number of dimensions recited is determined by the number of input dimensions. The control map 31 of FIG. 2*a* comprises input variable 1 (i.e. a first input variable) and input variable 2 (a second input variable). The look-up table defines a plurality of values (actuator setpoints) for different combinations of input variable 1 and input variable 2. As such, the lookup table control map 31 may be used to select an actuator setpoint based on the values of input variables 1 and 2. FIG. 2*b* is a graphical representation of the hypersurface defined by the values in the look-up table control map 31. As is known in the art, interpolation of the setpoints defined in the look-up table may be used to find a location on the hypersurface where one or more of the input variables do not exactly match the values stored in the look-up table.

In other embodiments, alternative means may be used to describe the hypersurface for each control map 30. For example, the hypersurface may be defined as a function of the input variables. Suitable multidimensional functions for defining a hypersurface may be a universal approximator function. Suitable universal approximator functions may include: artificial neural networks (e.g. radial basis functions, multilayer perceptrons), multivariate polynomials, fuzzy logic, irregular interpolation, kringing.

The plurality of control maps 30 may be stored in the memory of the internal combustion engine controller 10 such that the various processing modules of the internal combustion engine controller 10 can access the control maps 30.

As shown in FIG. 1, the internal combustion engine controller 10 also includes a map updating module 40. The map updating module 40 is configured to calculate an optimised hypersurface for at least one of the control maps 30. In the embodiment of FIG. 1, the map updating module 40 calculates an optimised hypersurface for each of the control maps 30 concurrently. The map updating module 40 is configured to update the hypersurface of a control map 30 based on the optimised hypersurface. Accordingly, the hypersurface for one or more control maps 30 may be updated during operation of the internal combustion engine 1. By providing a set of updatable control maps 30, a set of control maps 30 may be provided which can be optimised to a range of different operating points. Thus, the number of control maps that need to be calibrated for an internal combustion engine 1 may be reduced, as the set of updatable control maps 30 of this disclosure may provide control covering a range of different operating points for which separate sets of control maps (i.e. multiple sets of control maps) may have been calibrated in the past.

The map updating module 40 is configured to calculate the optimised hypersurface based on a real-time performance model of the internal combustion engine 1. By real-time performance model, it is understood that the calculation (optimisation) is based on a model of the performance internal combustion engine which is calculated in real time, rather than, for example, an off-line calculation of historic engine data. The real-time performance model uses sensor data from the internal combustion engine 1 and the plurality of input variables (i.e. real-time input variables to the internal combustion engine). As such, the real-time performance model may use additional sensor data from the internal combustion engine, in addition to the input variables to the control maps in order to optimise the control maps. Effectively, the internal combustion engine controller 10 of this disclosure incorporates additional variables (direct and/or indirect sensor data variables) into the control of the internal combustion engine in manner which does not significantly increase the computational complexity of the map based control.

The map updating module 40 consequently uses the real-time performance model to calculate an optimised hypersurface which optimises the real-time performance of the internal combustion engine 1. As such, the map updating module 40 may search for an optimised hypersurface. For example, the map updating module 40 may search for an optimised hypersurface by modelling a real-time performance of the internal combustion engine for a plurality of candidate groups of actuator setpoints and calculate the optimised hypersurface based on the modelled real-time performance.

For example, the map updating module 40 may be configured to calculate an optimised hypersurface for the IMAPR control map. The IMAPR control map 30 may be based on the input variables: engine speed (N) and Torque Requested (TqR). The map updating module 40 may model the real-time performance of the internal combustion engine 1 for a plurality of candidate groups of engine actuator setpoints. For example a candidate group of engine actuator setpoints may include: SOI, Fuel mass, EGR Requested, and IMAPR. The map updating module 40 may vary one or more of the engine actuator setpoints between each candidate group of engine actuator setpoints in order to search for an optimised hypersurface for the IMAPR control map 30. In one embodiment in which only the IMAPR control map 30 is updated, the engine actuator setpoint for IMAPR may be varied between each of the candidate groups of engine actuator setpoints. Based on the modelled real-time performance results for each candidate group, the map updating module 40 may determine an optimised hypersurface for the IMAPR control map. As discussed above, the optimised hypersurface may only be a portion of the total hypersurface defined by the control map 30.

Figure 3:
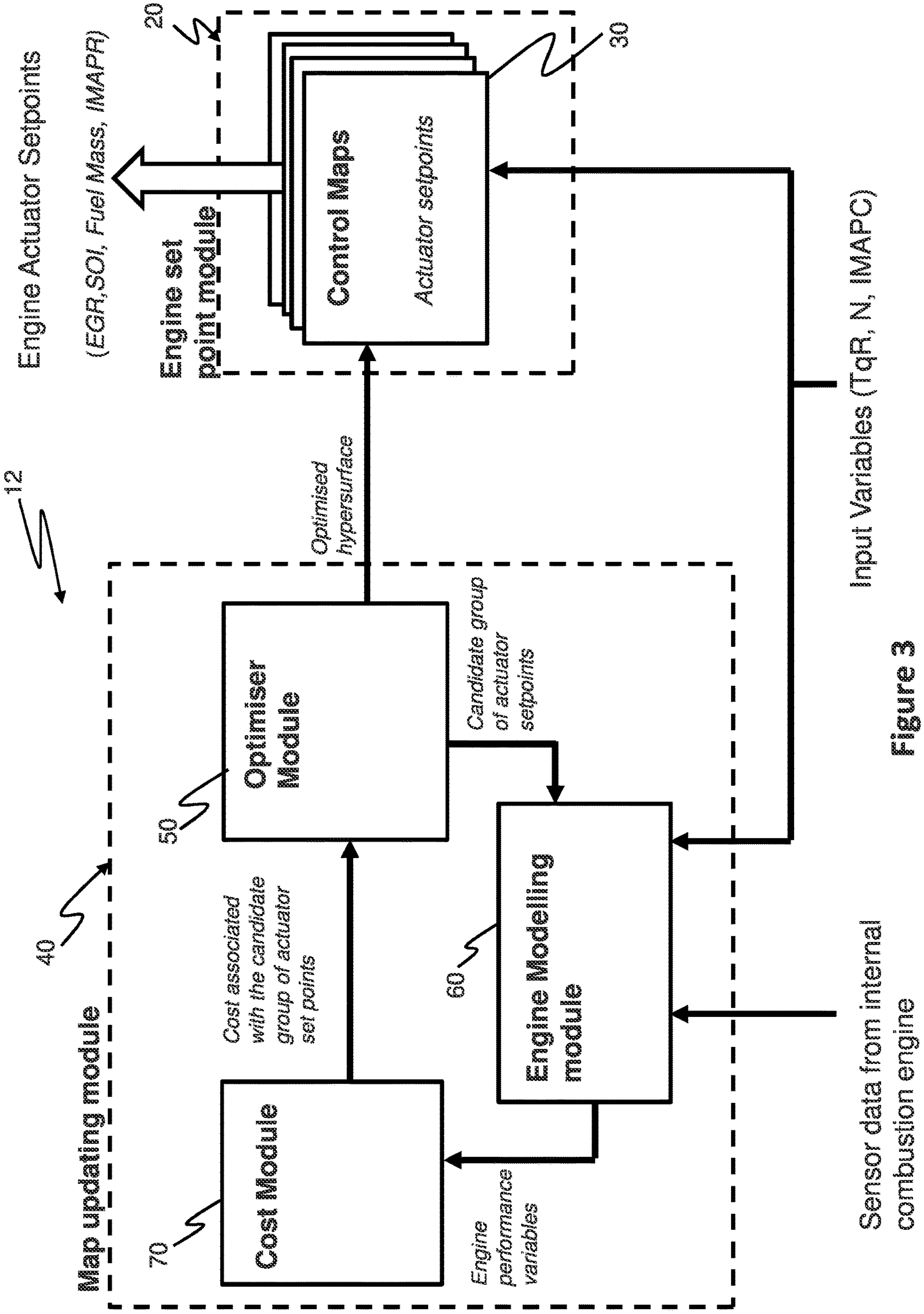
FIG. 3 shows a block diagram of an internal combustion engine controller according to an embodiment of this disclosure.

FIG. 3 shows a more detailed block diagram of an internal combustion engine controller 12 according to an embodiment of the disclosure. The block diagram indicates in dashed lines the engine setpoint module 20 and the map updating module 40. As such, the internal combustion engine controller 10 has a similar general structure to the structure shown in FIG. 1.

Thus, with reference to FIG. 1 and the corresponding description, it will be understood that the engine setpoint module 20 operates to output a plurality of actuator setpoints based on locations on hypersurfaces of respective control maps 30 defined by the plurality of input variables.

The map updating module 40 comprises an optimiser module 50, and engine modelling module 60 and a cost module 70. As discussed above, the map updating module 40 is configured to calculate an optimised hypersurface for one or more of the control maps 30. In this embodiment, the map updating module 40 is configured to calculate an optimised hypersurface for a plurality of the control maps 30. For example, in the embodiment of FIG. 3, control maps for each of SOI, Fuel mass, EGR Requested, and IMAPR are provided. The control maps 30 for SOI, Fuel mass, and EGR Requested are each a function of input variables engine speed (N), Torque Requested (TqR) and IMAPC. The control map for IMAPR is a function of engine speed (N) and Torque Requested (TqR).

The optimiser module 50 is configured to search for an optimised hypersurface for at least one of the control maps 30. In this embodiment, the optimiser module 50 is configured to search for an optimised hypersurface for each of the control maps 30 for SOI, Fuel mass, and EGR Requested concurrently. The optimiser module 50 may be configured to search for an optimised hypersurface for IMAPR at a different time. As such, it will be appreciated that the map updating module 40 does not need to update all of the control maps at the same time. In other embodiments, it will be appreciated that the optimiser module may update all of the control maps at the same time.

The optimiser module 50 is configured to search for an optimised hypersurface wherein the optimiser module 50 provides a plurality of candidate groups of actuator setpoints to an engine modelling module 60. Each candidate group of actuator setpoints is effectively a vector of setpoints for each of the control maps 30. The candidate group of actuator setpoints may include an actuator setpoint for each control map 30 to be updated. The candidate group of actuator setpoints may also include actuator setpoints for control maps 30 which are not presently being updated by map updating module 40. For example, in the embodiment of FIG. 3 a candidate group of actuator setpoints comprises a setpoint for each of SOI, Fuel mass, EGR Requested and IMAPR. By including the IMAPR actuator setpoint in the candidate group, even though this control map 30 is not being updated, the real-time performance model accuracy may be improved. Essentially, in the embodiment of FIG. 3, the IMAPR setpoint is treated as a time-invariant setpoint. Control maps (e.g. the control map for IMAPR) not updated by the optimiser module 50 may be updated by other means. As discussed further below, a plurality of different optimiser functions may be provided to update different control maps.

The optimiser module 50 outputs the each candidate group of actuator setpoints to the engine modelling module 60. The optimiser module 50 may select the candidate groups of actuator setpoints to be modelled in a variety of ways. For example, the optimiser module may select each actuator setpoint randomly from within a predefined range of allowable actuator setpoints in order to provide a plurality of essentially randomised actuator setpoints for each candidate of the groups, and select the lowest cost or function value. As such, the candidate groups of actuator setpoints are selected at random (a randomised search strategy). Other alternative searching strategies are discussed in more detail below. The number of candidate groups output by the optimiser module is based on the computational resources available for calculating the optimised hypersurface. As will be appreciated, the map updating module 40 is configured to output an optimised hypersurface based on the real-time performance of the internal combustion engine. In the embodiment of FIG. 3, the map updating module is configured to output an optimised hypersurface within 60 ms. Thus, the processing time taken to process a single candidate group of engine actuator setpoints will place an upper limit on the number of possible candidate groups that may be output within a single 60 ms period. The processing time taken to process a single candidate group of engine actuator setpoints depends on the features of the engine modelling module 60 and the cost module 70 which are explained in more detail below. Typically, processing a single candidate group of engine actuator setpoints may take around 0.1 ms. So, in the embodiment of FIG. 3, about 200 candidate groups of engine actuator setpoints may be evaluated by the map updating module 40, taking around 20 ms. Accordingly, for a map updating module configured to output an optimised hypersurface within 60 ms, a processing budget of around 30 ms may be allocated for residual processing and around 10 ms of slack time.

The engine modelling module 60 is configured to calculate a plurality of engine performance variables associated with each candidate group of actuator setpoints. The inputs to the engine modelling module 60 are the plurality of input variables of the control maps, as well as sensor inputs from the internal combustion engine, and the candidate group of actuator setpoints. As such, the engine modelling module 60 is provided with a plurality of performance variables associated with the real-time operation of the internal combustion engine. Accordingly, the plurality of engine performance variables calculated by the engine modelling module 60 may be representative of the real-time performance of the engine modelling module 60. Thus the engine modelling module 60 is an example of a real-time performance model.

In the embodiment of FIG. 3 the engine modelling module 60 is provided with a candidate group of actuator setpoints for SOI, Fuel mass, EGR Requested, and IMAPR. The engine modelling module is also provided with a plurality of real-time data from sensors of the internal combustion engine. Sensor data from the internal combustion engine may include information from various sensors associated with the internal combustion engine. Sensor data may also include various variables derived from data from one or more sensors of the internal combustion engine. For example the sensor data may include inlet manifold pressure, inlet manifold temperature, fuel rail pressure, back pressure valve position, mass EGR flow, mass total air flow, fuel mass flow, fuel rail pressure (FRP).

The engine modelling module 60 may include one or more models configured to calculate a plurality of engine performance variables associated with each candidate group of actuator setpoints. It will be appreciated that as the inputs to the engine modelling module 60 include the input variables to the internal combustion engine and the sensor data, the performance variables will be representative of a real-time performance of the internal combustion engine under those actuator setpoints. The performance variables calculated may include: engine torque, mass airflow, brake mean effective pressure (BMEP), net indicated mean effective pressure (IMEP), pumping mean effective pressure (PMEP), friction mean effective pressure (FMEP), exhaust manifold temperature, peak cylinder pressure, NOx quantity (e.g. Net Indicated Specific NOx (NISNOx), Brake Indicated Specific NOx) Soot quantity (e.g. Net Indicated Specific Soot, Brake Indicated Specific Soot), NOx/Soot ratio, minimum fresh charge, EGR potential.

In some embodiments, the internal combustion engine controller calculates Net Indicate Specific performance variables (e.g. IMEP, NISNOx). IMEP reflects the mean effective pressure of the internal combustion engine across the whole engine cycle. By contrast, BMEP is the mean effective pressure calculated from the brake torque. In some embodiments, Net Indicated Specific values may be used (e.g. IMEP, NISNOX) as these values are non-zero even when the engine is idling.

In this disclosure, Net indicated specific NOx (NISNOx) and Brake Indicated Specific NOx are further intended to refer to the NOx quantity output by the internal combustion engine, prior to any treatment in an aftertreatment system. Of course, the skilled person will appreciate that the NOx quantity may also be estimated downstream of the aftertreatment system (e.g. tailpipe NOx).

The physical relationships between the above performance variables and the inputs provided to the engine modelling module are well known to the skilled person. As such, the engine modelling module may provide one or more physics based models to calculate one or more of the above performance variables. As an alternative to physics based models, the engine modelling module may also calculate one or more of the above performance variables using empirical/black box models, or a combination of empirical and physics based models (i.e. semi physical/grey box models).

For example, the engine modelling module 60 may include a mean value engine model. Mean value engine models are well known to the skilled person for modelling engine performance parameters such as BMEP, engine torque, mass airflow etc. Further explanation of a mean value engine model suitable for use in the present disclosure may be found "Event-Based Mean-Value Modeling of DI Diesel Engines for Controller Design" by Urs Christen et al, SAE Technical Paper Series. Thus, a mean value engine model may be used to calculate engine performance variables based on the inputs to the engine modelling module 60.

In addition to, or as an alternative to, the use of a mean value model, the engine modelling module 60 may include one or more neural network based models for calculating one or more engine performance variables. For example, a Net Indicated Specific NOx (NISNOx) engine performance variable may be calculated from the sensor data using a suitably trained neural network. Further explanation of suitable techniques for calculating engine performance variable such as NISNOx using a neural network may be found in "Development of PEMS Models for Predicting NOx Emissions from Large Bore Natural Gas Engines" by Michele Steyskal et al, SAE Technical paper series.

Physics based models of one or more internal combustion engine components may be provided. For example, a compressor model, a turbine model, or an exhaust gas recirculation cooler model may be provided in order to help calculate suitable performance variables.

The engine modelling module 60 outputs the engine performance variables to the cost module 70. The cost module 70 is configured to evaluate the engine performance variables and output a cost associated with each candidate group of actuator setpoints based on the performance variables. In the embodiment of FIG. 3 the cost module is configured to output the optimiser module 50. In other embodiments, the evaluation of the costs associated with each candidate group of actuator setpoints may be performed by a further module separate to optimiser module 50.

The cost module 70 may comprise a plurality of functions configured to assign a cost to various performance targets in order to evaluate the performance of the engine. Each cost function may output a cost based on or more engine performance variables and one or more cost parameters. For example, the plurality of functions may comprise one or more performance objective functions, one or more emissions functions, and one or more engine constraint functions. Each of the plurality of functions may be configured to output a cost based on a function of one or more of the performance variables and one or more cost parameters. The cost parameters determine the magnitude of the cost associated with each performance parameter. In the embodiment of FIG. 3, the cost functions are configured such that a lower cost is associated with a more optimal performance.

Figure 4A:
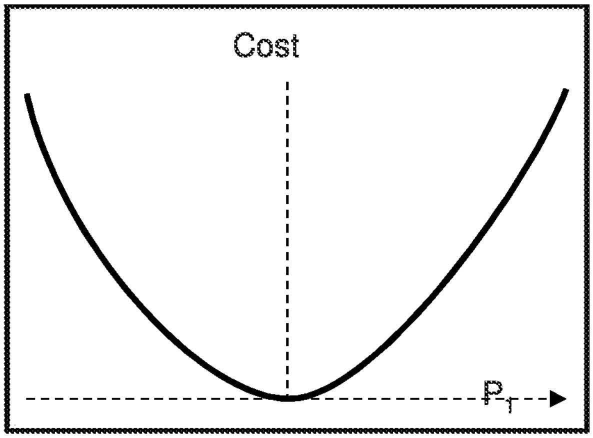
FIGS. 4*a*, 4*b* and 4*c* show graphical representations of suitable functions for a performance objection function, an emissions function, and an engine constraint function respectively.

A performance objective function may be a function configured to optimise the internal combustion engine to meet certain performance objectives. For example, performance objective may be to minimise Brake Specific Fuel Consumption (BSFC) or Net Indicate Specific Fuel Consumption (NISFC). A further performance objective may be to minimise torque error (i.e. the difference between the actual output torque and the torque requested). Such forms of performance objective function may be represented by a function having a weighted square law relationship (i.e. of the form: Cost=Weight*(performance variable)^2). As such, for a performance objective function, a weight of the performance objective function is a cost parameter. A graphical representation of a suitable performance objective function is shown in FIG. 4*a*. For example, a performance objective for NISFC ($Cost_{NISFC}$) may be:

$$Cost_{NISFC}=Weight_{NISFC}*NISFC^{\wedge}2$$

Figure 4B:
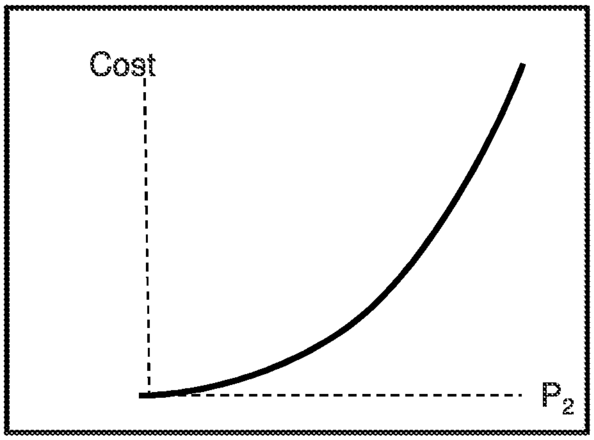

An emission function may be a function configured to optimise the internal combustion engine in order to meet certain objectives in relation to the emissions produced by the internal combustion engine. For example one or more emissions function may be provided based on engine performance variables relating to emissions produced by the internal combustion engine. As such, one or more emissions functions may be based on NOx quantity (NISNOx, Soot (NISCF), NOx Soot ratio, minimum fresh charge, and/or EGR potential. The emissions functions may define a relationship between a cost and the engine performance variables using any suitable function. For example, in the embodiment of FIG. 3, the emissions functions may be provided as one sided square law functions. A graphical representation of a suitable emissions function is shown in FIG. 4*b*.

For example, an emissions function may include a target upper limit (T). The target upper limit may define a value for an engine performance variable above which the cost incurred becomes significant, whereas for values below the target upper limit, no cost, or minimal cost is incurred. For example, for some internal combustion engines, a target upper limit for NISNOx may be 4 g/kWh. Thus, for an emissions function a target upper limit, and/or a weight may be a cost parameter. In other embodiments, a target limit may be provided as a target lower limit.

Accordingly, an emissions function ($Cost_{NOx}$) based on the engine performance variable NISNOx may be:

When: NISNOx<T, $Cost_{NOx}=0$

NISNOx≥T, $Cost_{NOx}=Weight_{NOx}*(NISNOx-T)^{\wedge}2$

Figure 4C:
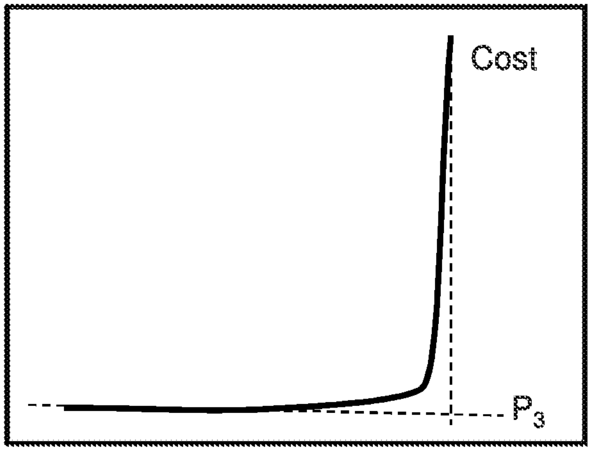

An engine constraint function may be a function configured to reflect constraints associated with the performance of the internal combustion engine. As such, the one or more engine constraint functions may be provided to discourage or prevent the controller from operating at certain engine actuator setpoints. For example, one or more engine constraint functions may be based on engine performance variables which have fixed limits which cannot be exceeded due to physical requirements of the internal combustion engine. As such, one or more engine constraint functions may be based on peak cylinder pressure (PCP), exhaust manifold temperature, compressor outlet temperature. Further engine performance variables which may have desirable fixed limits such as max torque error may also have a corresponding engine constraint function. Each engine constraint function may define a relationship between a cost and one or more of the engine performance variables using any suitable function. For example, in the embodiment of FIG. 3, the engine constraint functions may be provided in the form Cost=1/engine performance variable(s). A graphical representation of a suitable engine constraint function is shown in FIG. 4*c*.

For example, an engine constraint function for the engine performance variable PCP may be provided based on a limit L. The cost calculated by the engine constraint function may rise asymptotically as the limit L is approached. Thus, a limit L may also be a cost parameter. Accordingly, an engine constraint function ($Cost_{PCP}$) based on the engine performance variable PCP may be:

$$Cost_{PCP}=1/(L-PCP)$$

As described above, various cost parameters have been described with respect to performance objective functions, emissions functions, and engine constraint functions. The cost parameters may be stored by the cost module 70, for example as a cost parameter vector. In some embodiments, the cost parameters may be time varying. That is to say, in some embodiments the cost module 70 may update one or more of the cost parameters in order to effect a change in the relative costs associated with different engine performance variables. For example, the cost module 70 may update one or more cost parameters in order to initiate regeneration of the aftertreatment system as described below.

Accordingly, the cost module 70 may calculate a total cost associated with each candidate group of actuator setpoints based on the costs calculated by each of the cost functions calculated above. The total cost associated with each candidate group of actuator setpoints may be provided to the optimiser module 50 for further processing.

The optimiser module 50 is configured to output an optimised hypersurface for the at least one control map 30 based on the candidate groups of actuator setpoints and the associated costs. As such, based on the total cost for each candidate group of actuator setpoints, the optimiser may identify a group of actuator setpoints which has an optimal performance. For example, the candidate group of actuator setpoints with the lowest total cost may provide optimal performance. Accordingly, the optimiser module 50 may update the control maps 30 based on the candidate group of actuator setpoints. As such, the control maps may be updated to provide the actuator setpoints of the candidate group of actuator setpoints for the input variables used by the map updating module 40 (i.e. the real time input variables).

Accordingly, an internal combustion engine controller 12 in accordance with the diagram shown in FIG. 3 may be provided.

As an alternative to a randomised searching strategy, other searching strategies may be employed by the optimiser. For example, the candidate groups of actuator setpoints may be selected according to an iterative searching strategy. As part of an iterative searching strategy a first set of candidate groups of actuator setpoints may be identified and analysed as described above to determine associated costs. The optimiser module 50 may then select a second set of candidate groups of actuator setpoints based on the first set of actuator setpoints and the associated costs (i.e. based on the lowest cost candidate groups of the first set of candidate groups). Examples of suitable searching iterative searching strategies include Genetic algorithms, Simplex, Stochastic optimisation and/or swarm algorithms.

Figure 5:
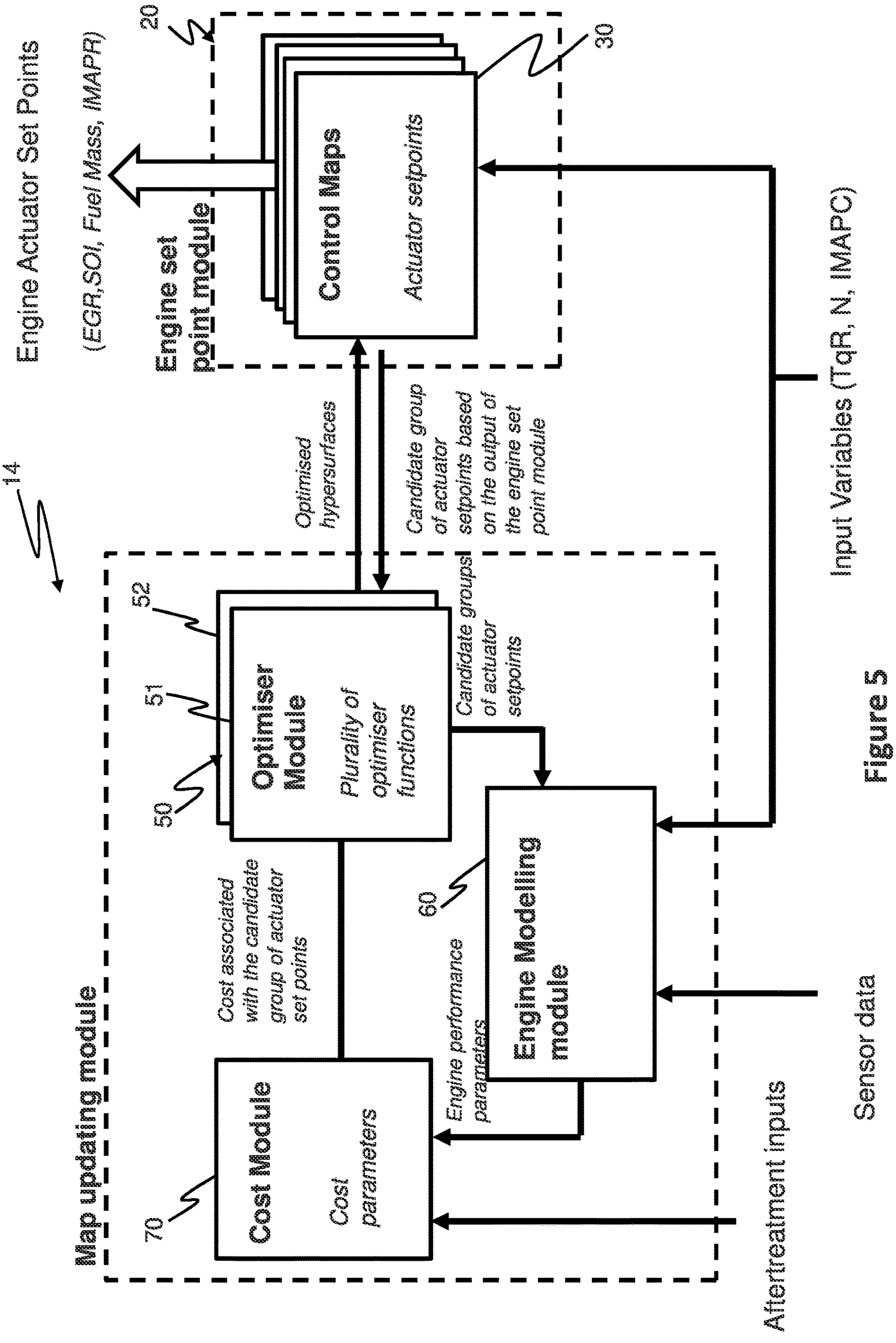
FIG. 5 shows a block diagram of an internal combustion engine controller according to a further embodiment of this disclosure.

FIG. 5 shows a further detailed block diagram of an internal combustion engine controller 14 according to an embodiment of the disclosure.

The block diagram indicates in dashed lines the engine setpoint module 20 and the map updating module 40. As such, the internal combustion engine controller 14 has a similar general structure to the structure shown in FIG. 1. Further, the block diagram indicates that the map updating module 40 comprises optimiser module 50, engine modelling module 60 and cost module 70. As such, the map updating module 40 also has a similar general structure to the structure shown in FIG. 3 and discussed in the supporting description above. As such, it will be appreciated that the functionality of the internal combustion engine controller 14 may be similar to the internal combustion engine controllers 10, 12 described above.

As shown in FIG. 5, the optimiser module 50 may be further modified to incorporate an input from the control maps 30. The optimiser module 50 is configured to select one candidate group of actuator setpoints based on the control signal output of the engine setpoint module 20. As such, the current control signal output by the internal combustion engine controller 14 may be provided to the map updating module 40 in order to be evaluated as one of the candidate groups of actuator setpoints. Accordingly, the map updating module 40 may evaluate locations on the current hypersurfaces defined by the control maps 30 when calculating the optimised hypersurfaces.

As will be appreciated by the skilled person, the output of the engine setpoint module 20 may be based on control maps 30 which have previously been updated by the map updating module 40. Thus, the candidate group of actuator setpoints based on the control signal output of the engine setpoint module 20 may reflect a previously calculated optimal hypersurface. As such, the internal combustion engine controller 14 may effectively incorporate a form of memory in which previously calculated optimal hypersurfaces may influence the candidate groups of actuator setpoints evaluated by the optimiser module 50.

As shown in FIG. 5, the optimiser module 50 may comprise a plurality of optimiser functions 51, 52. In the embodiment of FIG. 5, the optimiser module 50 comprises two optimiser functions, a current state optimiser function 51 (a short term optimiser function) and a converged state optimiser function (long term optimiser function) 52.

Each of the optimiser functions 51, 52 is configured to search for an optimal hypersurface independently of the other optimiser functions. As such, each of the optimiser functions 51, 52 may be configured to communicate with the engine modelling module 60 and the cost module 70 in substantially the same manner as the optimiser module 50 as described for the embodiment in FIG. 3.

The plurality of optimiser functions 51, 52 may be configured to output updated control hypersurfaces at different rates. Effectively, some of the optimiser functions may be provided with increased computational time/resources in order to search for an optimised hypersurface at a faster rate relative to the other optimiser functions. For example, the current state optimiser 51 of FIG. 5 may be configured to search for an optimised hypersurface based on a current state of the internal combustion engine 1. The converged state optimiser 52 of FIG. 5 may be configured to search for an optimised hypersurface based on a converged state of the internal combustion engine 1.

In the embodiment of FIG. 5, the converged state optimiser function 52 is configured to update a first selection of the control maps. The current state optimiser function 51 is configured to update a second selection of the control maps. The first selection of control maps 30 to be updated by the converged state optimiser function 52 control actuators which may have a relatively greater influence on the converged state of the internal combustion engine 1. Such control actuators of the first selection which may have a relatively greater influence on the converged state of the internal combustion engine 1 typically have a frequency response with a relatively low characteristic frequency. The second selection of control maps may comprise control maps for actuators which are constrained by and have a higher frequency response than other actuators which dominate the frequency response of the overall system and constrain other variables. As such, the converged state optimiser function 52 optimises control maps for actuators which have a lower characteristic frequency compared to the actuators controlled by the second selection of control maps.

For example, the converged state optimiser function 52 may update the control map for IMAPR, while the current state optimiser function 51 may update the control maps for Fuel Mass and EGR. It will be appreciated that the optimal actuator setpoints for Fuel Mass and EGR are influenced by the total mass flow into the engine. The total mass flow into the engine may be in turn influenced by the IMAP. IMAP, which is in turn controlled by the control map for IMAPR has a relatively low characteristic frequency compared to EGR and Fuel Mass. Accordingly, the control map for IMAPR may have a relatively significant effect on the converged state optimal operating point for the internal combustion engine 1. By contrast, actuator settings for Fuel Mass and EGR, which have a relatively high characteristic frequency, may be optimised based on the current state of the internal combustion engine.

In the embodiment of FIG. 5, the current state optimiser function 51 is configured to update a selection of the control maps 30. The control maps 30 to be updated by the current state optimiser function 51 control actuators which may have a more significant influence on the current state of the internal combustion engine 1. For example, the current state optimiser function 51 may update the control maps for SOI, Fuel mass, and EGR requested. Variations in these actuator setpoints typically affect the performance of the internal combustion engine in a relatively short time period. That is to say, these actuators have characteristic frequencies similar to or higher than a characteristic calculation frequency of the map updating module 40. For example, the map updating module may have a characteristic calculation frequency equal to the frequency of calculations performed by the current state optimiser 51. As such, the current state optimiser function 51 updates actuators which have little, or no time lag, relative to the frequency of map updates.

In the embodiment of FIG. 5, the current state optimiser function 51 may be configured to calculate an optimised hypersurface within a time period of no greater than 500 ms. In some embodiments, the current state optimiser function 51 may be configured to calculate an optimised hypersurface within a time period of no greater than: 300 ms, 200 ms, or 100 ms. In one embodiment, the current state optimiser function 51 may be configured to calculate an optimised hypersurface within a time period of no greater than 60 ms.

In the embodiment of FIG. 5, the converged state optimiser function 52 may be configured to calculate an optimised hypersurface within a time period of no greater than 1000 ms. In some embodiments, the converged state optimiser function 52 may be configured to calculate an optimised hypersurface within a time period of no greater than: 800 ms, 600 ms, 400, or 200 ms. In one embodiment, the converged state optimiser function 52 may be configured to calculate an optimised hypersurface within a time period of no greater than 120 ms.

As shown in FIG. 5, the cost module 70 includes additional inputs from an aftertreatment system. Accordingly, the cost module 70 may incorporate data generated by the aftertreatment system when evaluating the performance of each group of candidate of actuator setpoints.

The cost module 70 may utilise data from the aftertreatment system to update at least some of the cost functions. As such, the data from the aftertreatment system may be used to adapt the relative weights associated with each engine performance variable. As such, the cost functions may be updated from a preference for prioritising low fuel consumption to prioritising high exhaust temperature.

For example, the cost module 70 may utilise data from the aftertreatment system in order to determine that a regeneration of the aftertreatment system is to be performed (e.g. an indication from the aftertreatment system that regeneration of a Diesel Particulate Filter is required). The cost module 70 may update some of the costs functions of the model in order to effect a regeneration of the aftertreatment system. For example, a cost function (e.g. a performance objective function) may be provided to control an exhaust minimum temperature. To regenerate the aftertreatment system, the exhaust temperature minimum penalty may be increased (e.g. to 400° C.) to encourage the optimiser to calculate an optimised hypersurface which increases exhaust temperature. The internal combustion engine may not be able to reach such an exhaust temperature, but will be encouraged to find a solution that minimises the deviation from this value. When aftertreatment thermal management is not required, the exhaust temperature minimum penalty may be set to a negligible value (e.g. −180° C.). Thus when not required, the cost function will not consider this term.

In other embodiments, the cost module 70 may adapt the weights of the cost functions in order to cause a regeneration of the aftertreatment system. As such, the cost functions may be updated from a preference for prioritising low fuel consumption to e.g. prioritising high exhaust temperature by altering one or more values associated with the cost function(s)

In other embodiments, the cost module 70 may store emissions data received from the aftertreatment system relating to emissions of the internal combustion engine. The cost module 70 may utilise the emissions data to monitor the emissions performance of the internal combustion engine. In some embodiments, the cost module 70 may adjust one or more of the emissions functions based on the monitored emissions performance. Thus, the internal combustion engine controller 14 may be configured to control an internal combustion engine in a manner which complies with various emissions regulations. It will be appreciated that emissions regulations may vary depending on the location of operation of the internal combustion engine. Unlike time-invariant control maps, which may be individually calibrated to comply with specific emissions targets in advance, the cost module 70 of the internal combustion engine may be updated to comply with local emissions regulations as appropriate. Thus, the calibration requirements of the internal combustion engine controller 14 may be reduced.

INDUSTRIAL APPLICABILITY

The internal combustion engine controller 10, 12, 14 of this disclosure may be configured to control an internal combustion engine in variety of configurations.

One application may be for controlling the actuator setpoints of an internal combustion engine as illustrated in FIG. 1. The internal combustion engine may be installed on, for example, a vehicle or piece of machinery, or may form part of a generator.

The invention claimed is:

1. An internal combustion engine controller comprising:

a memory configured to store a plurality of control maps, each control map defining a hypersurface of actuator setpoints for controlling an actuator for an internal combustion engine, of a plurality of actuators for the internal combustion engine, based on a plurality of input variables to the internal combustion engine controller, each said actuator of the internal combustion engine having an associated characteristic frequency; and a processor comprising:

an engine setpoint module configured to output a control signal to each actuator based on a location on the hypersurface of the respective control map defined by the plurality of input variables; and a map updating module configured to calculate an optimised hypersurface for at least one of the control maps, wherein the optimised hypersurface is calculated based on a real-time performance model of the internal combustion engine comprising sensor data from the internal combustion engine and the plurality of input variables, wherein the map updating module is further configured to update the hypersurface of the control map based on the optimised hypersurface, wherein the map updating module is further configured to calculate an optimised hypersurface at a characteristic calculation frequency which is less than or equal to the characteristic frequency of the actuator associated with the control map, wherein the map updating module comprises:

an optimiser module configured to search for an optimised hypersurface wherein the optimiser module provides a plurality of candidate groups of actuator setpoints to an engine modelling module;

the engine modelling module, which is configured to calculate a plurality of engine performance variables associated with each candidate group of actuator setpoints based on the input variables, the sensor data from the internal combustion engine, and the candidate group of actuator setpoints; and a cost module configured to evaluate the engine performance variables and output a cost associated with each candidate group of actuator setpoints to the optimiser module, and wherein the optimiser module is configured to output an optimised hypersurface for the at least one control map based on the candidate groups of actuator setpoints and the associated costs.

2. The internal combustion engine controller according to claim 1, wherein the map updating module is configured to calculate an optimised hypersurface within a time period of 1 second.

3. The internal combustion engine controller according to claim 1, wherein the map updating module is configured to calculate an optimised hypersurface for each of the control maps concurrently; and the map updating module is configured to update the hypersurface of each of the control maps based on the respective optimised hypersurfaces.

4. The internal combustion engine controller according to claim 1, wherein the map updating module is configured to calculate an optimised hypersurface by:

modelling a real-time performance of the internal combustion engine using the real-time performance model for a plurality of candidate groups of actuator setpoints; and calculating the optimised hypersurface based on the modelled real-time performances calculated.

5. The internal combustion engine controller according to claim 1, wherein the optimiser module is configured to search for an optimised hypersurface for each of the control maps.

6. The internal combustion engine controller according to claim 1, wherein the optimiser module comprises a plurality of optimiser functions, each optimiser function configured to search for an optimal hypersurface independently of the other optimiser functions.

7. The internal combustion engine controller according to claim 6 wherein the plurality of optimiser functions of the optimiser module output updated control hypersurfaces at different rates.

8. The internal combustion engine controller according to claim 6, wherein the plurality of optimiser functions comprise a first optimiser module and a second optimiser module, wherein the first optimiser module is configured to output an updated control hypersurface based on a current state; and the second optimiser module is configured to output an updated control hypersurface based on a converged state.

9. The internal combustion engine controller according to claim 1, wherein the cost module is configured to evaluate the engine performance variables based on a plurality of cost parameters.

10. The internal combustion engine controller according to claim 9, wherein the cost parameters comprise time varying cost parameters based on an input from an after-treatment system connected to the internal combustion engine.

11. The internal combustion engine controller according to claim 1, wherein one candidate group of actuator setpoints is based on the control signal output of the engine setpoint module.

12. The internal combustion engine controller according to claim 1, wherein the hypersurface of each control map is defined by a look-up table comprising a plurality of actuator setpoints for controlling an actuator of the internal combustion engine; and the map updating module calculates an optimised hypersurface comprising a group of updated actuator setpoints.

13. A method of controlling an internal combustion engine comprising:

providing a plurality of control maps each control map defining a hypersurface of actuator setpoints for controlling an actuator of the internal combustion engine, of a plurality of actuators of the internal combustion engine, based on a plurality of input variables to an internal combustion engine controller, each said actuator of the internal combustion engine having an associated characteristic frequency;

outputting a control signal to each actuator based on a location on the hypersurface of the control map defined by the plurality of input variables; and updating at least one of the control maps comprising:

calculating an optimised hypersurface for at least one of the control maps, wherein the optimised hypersurface is calculated based on a real-time performance model of the internal combustion engine comprising sensor data from the internal combustion engine and the plurality of input variables; and updating the hypersurface of the control map based on the optimised hypersurface, wherein the optimised hypersurface is calculated at a characteristic calculation frequency which is less than or equal to the characteristic frequency of the actuator associated with the control map, wherein said updating the at least one control map further comprises:

searching for the optimised hypersurface by determining a plurality of candidate groups of actuator setpoints;

calculating a plurality of engine performance variables associated with each candidate group of actuator setpoints based on the plurality of input variables, the sensor data from the internal combustion engine, and the candidate group of actuator setpoints; and evaluating the engine performance variables and calculating a cost associated with each candidate group of actuator setpoints, and wherein the optimised hypersurface for the at least one control map is calculated based on the candidate groups of actuator setpoints and the associated costs.

14. The method according to claim 13, wherein the optimised hypersurface is calculated within a time period of 1 second.

15. The method according to claim 13, wherein an optimised hypersurface is calculated for each of the control maps concurrently; and each of the control maps is updated based on its respective optimised hypersurface.

16. The method according to claim 13, wherein the optimised hypersurface is calculated by:

modelling a real-time performance of the internal combustion engine using the real-time performance model for a plurality of candidate groups of actuator setpoints; and calculating the optimised hypersurface based on the real-time performances calculated.

17. The method according to claim 13, wherein one candidate group of actuator setpoints is based on the control signal output to each actuator.

18. The method according to claim 13, wherein the hypersurface of each control map is defined by a look-up table comprising a plurality of actuator setpoints for controlling an actuator of the internal combustion engine; and the optimised hypersurface calculated comprises a group of updated actuator setpoints.

19. An internal combustion engine controller comprising:

a memory configured to store a plurality of control maps, each control map defining a hypersurface of actuator setpoints for controlling an actuator for an internal combustion engine, of a plurality of actuators for the internal combustion engine, based on a plurality of input variables to the internal combustion engine controller, each said actuator of the internal combustion engine having an associated characteristic frequency; and a processor comprising:

an engine setpoint module configured to output a control signal to each actuator based on a location on the hypersurface of the respective control map defined by the plurality of input variables; and a map updating module configured to calculate an optimised hypersurface for at least one of the control maps, wherein the optimised hypersurface is calculated based on a real-time performance model of the internal combustion engine comprising sensor data from the internal combustion engine and the plurality of input variables, wherein the map updating module is further configured to update the hypersurface of the control map based on the optimised hypersurface, wherein the map updating module is further configured to calculate an optimised hypersurface at a characteristic calculation frequency which is less than or equal to the characteristic frequency of the actuator associated with the control map, wherein the map updating module is further configured to:

search for the optimised hypersurface by determining a plurality of candidate groups of actuator setpoints, calculate a plurality of engine performance variables associated with each candidate group of actuator setpoints based on the plurality of input variables, the sensor data from the internal combustion engine, and the candidate group of actuator setpoints, and evaluate the engine performance variables and calculate a cost associated with each candidate group of actuator setpoints, and wherein the optimised hypersurface for the at least one control map is calculated based on the candidate groups of actuator setpoints and the associated costs.

* * * * *